Oct. 7, 1952  H. W. KLAS  2,612,776
PROBE SUPPORTING APPARATUS FOR WIND TUNNELS
Filed Oct. 17, 1951  2 SHEETS—SHEET 1
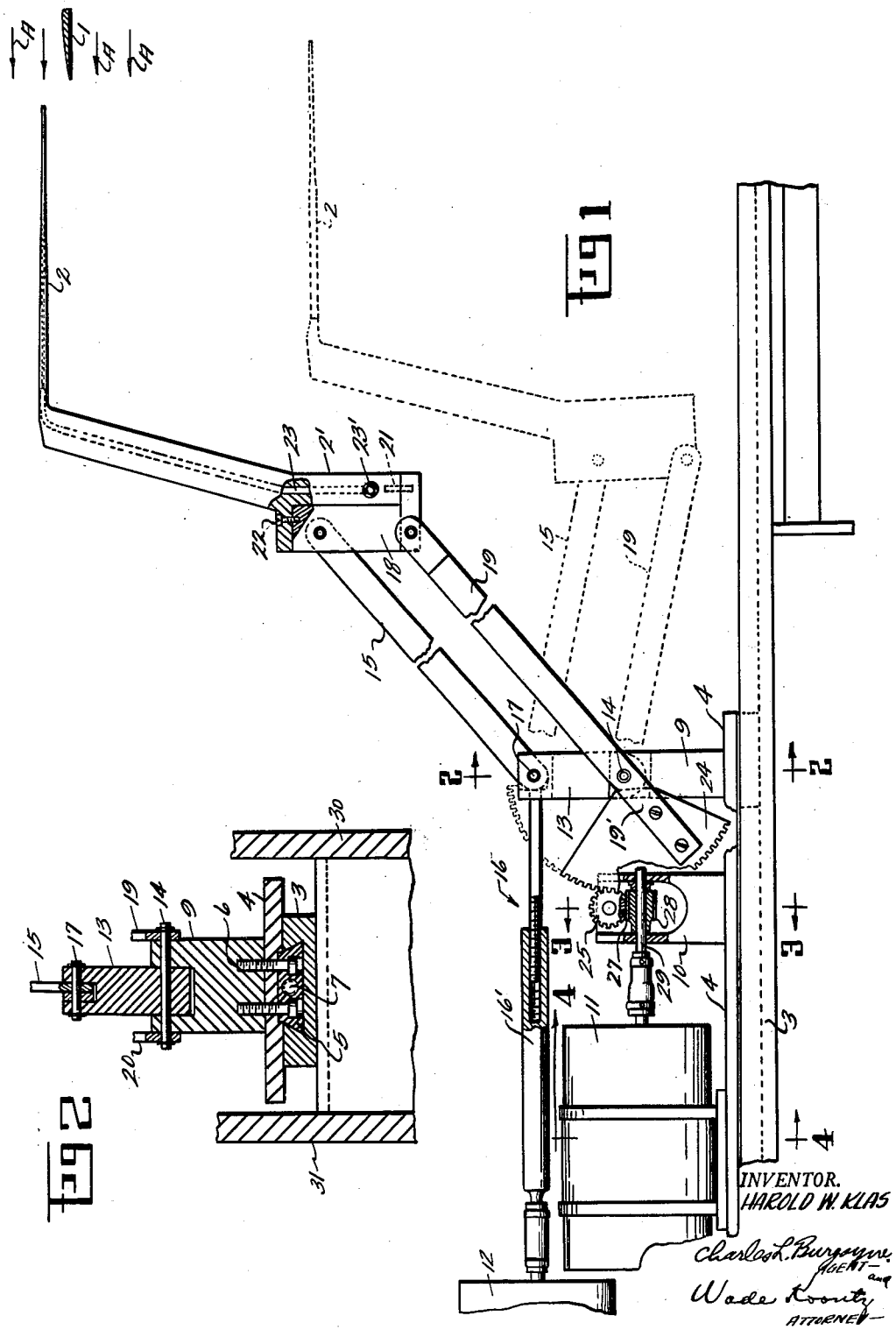
INVENTOR.
HAROLD W. KLAS
Charles L. Burgoyne
AGENT and
Wade Koontz
ATTORNEY Oct. 7, 1952            H. W. KLAS            2,612,776
PROBE SUPPORTING APPARATUS FOR WIND TUNNELS
Filed Oct. 17, 1951            2 SHEETS—SHEET 2
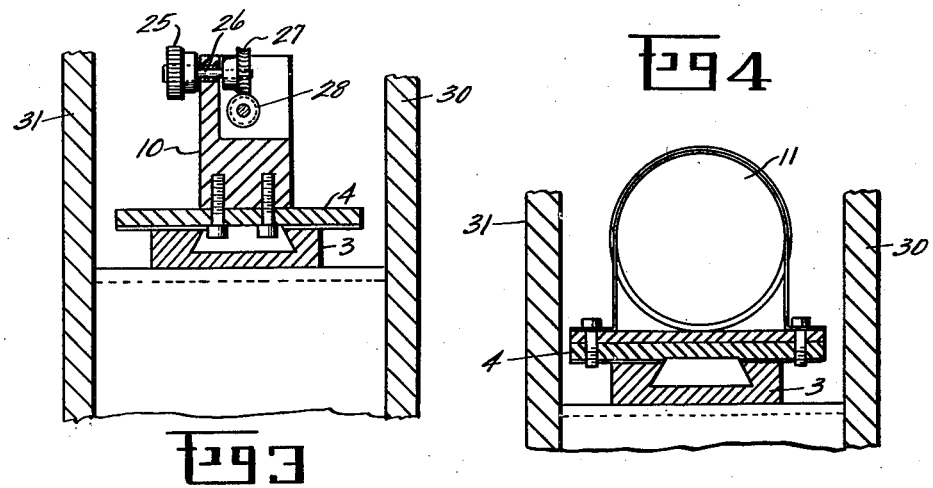
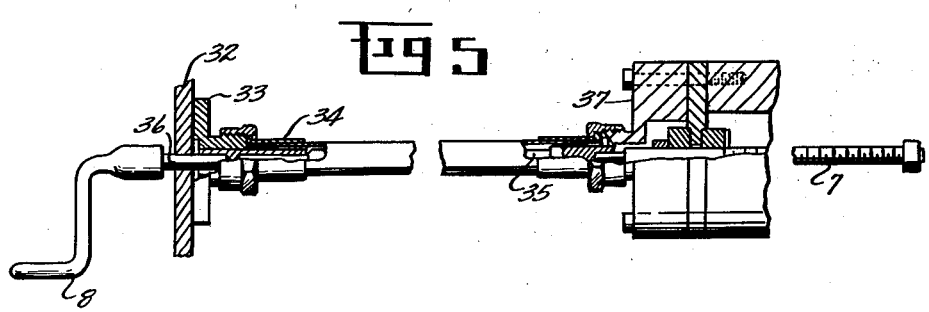
INVENTOR.
HAROLD W. KLAS Patented Oct. 7, 1952

2,612,776

UNITED STATES PATENT OFFICE 2,612,776

PROBE SUPPORTING APPARATUS FOR WIND TUNNELS

Harold W. Klas, Sylvania, Ohio, assignor to the United States of America as represented by the Secretary of the Air Force Application October 17, 1951, Serial No. 251,656

6 Claims. (Cl. 73—147)

1

This invention relates to a probe supporting apparatus for use in a wind tunnel to adjustably support a hollow probe for obtaining the characteristics of the air flow in the tunnel.

The primary object of the invention is to provide a supporting apparatus for a hollow probe to be positioned in a wind tunnel for determining the characteristics of the air passing over a test specimen as a vane, air foil or other aerodynamic section, and wherein the supporting apparatus includes means to vary the angle of the probe with respect to the general direction of air flow and means to vary the relative spacing between the probe and aerodynamic section in horizontal and vertical directions respectively.

A further object of the invention is to provide a supporting apparatus for a hollow probe to be positioned in a wind tunnel for determining the characteristics of the air passing over a test specimen such as a vane or air foil and wherein the supporting apparatus includes a parallelogram linkage of which one link is part of the probe structure, wherein means is provided to rotate a link parallel to the link forming part of the probe structure and wherein independent means is provided to rotate another link forming one of the other pair of links in the parallelogram linkage, whereby the probe structure may be readily adjusted to any position in the plane of the probe structure and to any relative angle within the limits of the mechanical elements forming the supporting apparatus.

The above and other objects of the invention will become apparent on reading the following detailed description in conjunction with the drawings, in which:

Fig. 1 is a side elevation view of the probe supporting apparatus.

Fig. 2 is a transverse cross section taken on line 2—2 of Fig. 1.

Fig. 3 is a transverse cross section taken on line 3—3 of Fig. 1.

Fig. 4 is a transverse cross section taken on line 4—4 of Fig. 1.

Fig. 5 is a longitudinal cross section of a lead screw driving means for moving the main carriage along the base of the apparatus.

In supersonic wind tunnels for aerodynamic testing of vanes and air foils a means should be provided in back of or downstream from the test specimen for determining or continuously sampling the characteristics of the air flow past the test specimen. Placing of the air sampling probe downstream from the test specimen will always prevent air flow disturbance ahead of the test specimen. The test specimen may be mounted at

2 various angles of attack with respect to the general direction of air flow and in various positions with respect to the walls of the tunnel. Thus provision must also be made to facilitate positional adjustment of the air sampling probe near to or in predetermined spaced relation with respect to the test specimen. Furthermore in case a series of spaced apart vanes are under test simultaneously it should be possible to periodically adjust the air sampling probe to various positions near the respective vanes according to which vane is being studied at the moment. The air flow over and around the vanes may be analyzed by the various means such as Schlieren pictures or smoke patterns and the forces acting on the vanes may be determined in some cases by delicate force measuring devices combined in the vane suspension means.

In the present probe supporting apparatus as shown in Fig. 1 the probe supporting apparatus is shown apart from a wind tunnel but it will be understood that the air flow will be in the general direction of the arrows A and that the element 1 represents an air foil mounted in the wind tunnel upstream from the probe and probe supporting apparatus. The open free end of the probe 2 is normally positioned just behind or downstream with respect to the air foil element 1. The probe supporting apparatus is positioned in the wind tunnel and includes a bed plate 3 fixed to the floor of the tunnel and extending longitudinally thereof.

The probe supporting and adjusting apparatus itself comprises a base 4 slidably mounted in ways formed in the bed plate 3 (see Fig. 2). The dovetail ways in the bed plate receive a beveled member 5 attached rigidly to the underside of the base 4 by screws 6. Midway between the beveled edges the member 5 is provided with a screw threaded opening to receive a lead screw 7 adapted for rotation by a manually operated crank 8 (see Fig. 5). The screw 7 when rotated in one direction or the other causes longitudinal reciprocation of the base or carriage 4 to bring the probe supporting apparatus into any desired position along the length of the wind tunnel or along the length of the bed plate 3. Fixed to the base 4 in consecutive series are a probe supporting standard 9, a gear box 10, a first servomotor 11 and a second servomotor 12. The standard 9 is bifurcated at its upper end to receive a lever 13 rotatably mounted on a transverse pin 14. The upper end of the lever 13 is also bifurcated to receive a link 15 and also one end of a turnbuckle 16 secured in place by means of a transverse pivot 17. The other end portion 16' of the turnbuckle 16 is threadedly connected to the lever and link actuating end and is rotatably actuated by the servomotor 12. The outer end of the link 15 serves to pivotally support a block 18, while at its lower end the block is pivotally supported by a pair of similar spaced apart links 19 and 20. The other ends of links 19 and 20 are pivotally mounted on opposite ends of the transverse pin 14. The probe element 2 includes a lower end 2' of inverted L-shape. The downwardly extending leg is retained in position by a small dowel pin 21, while the upper horizontal leg is held in place by a screw 22. For removing the probe element 2 this provides a convenient mounting means, since removal of the one screw 22 permits instant removal of the probe. A central air passage 23 in the probe extends from a small nipple 23', adapted to connect with a flexible tubing, to the extreme free end of the probe adjacent to the trailing edge of vane or air foil 1.

Changes in the angle of links 15 and 19, 20 independently of the possible movement of lever 13 is effected by actuation of the link 19. The lower end of link 19 carries an extension 19' on which is fixed a gear sector 24. The sector 24 meshes with a pinion 25 rotatably situated to one side of the gear box or support 10 and rigidly mounted on a shaft 26. The shaft 26 also carries a second pinion or gear 27 in mesh with a worm 28 carried on an extension shaft 29 on the servomotor 11. Thus rotation of the motor 11 in either direction effects movement of the link 19 about the pin 14 and thus raises and lowers the probe supporting block 18. The links 15 and 19 and their connecting members 13 and 18 form a parallelogram linkage moveable into an infinite number of positions. A second possible position of the linkage and probe is shown in dotted lines in Fig. 1. Just as the long links 15 and 19 are always maintained parallel, so are the short links 13 and 18 always parallel to each other. In the positions illustrated the probe 2 is approximately horizontal but by action of the servomotor 12 the vertical position of the link or lever 13 may be changed thus similarly changing the position of link 18 and causing an equiangular change in the relative position of probe 2. Within the limits of the mechanical elements, the probe 2 may assume an infinite number of positions near or around the air foil 1 and may also assume any angle above or below the horizontal position shown within the limits of movement of the lever 13 about the transverse pin 14.

The two servomotors 11 and 12 may be of any reversible type and may form Selsyn receivers in two independent powered Selsyn systems adapted to be remotely controlled from a central control board including a probe position indicator. In Figs. 2, 3 and 4 the side walls of the tunnel are represented by the sections 30 and 31 but the actual construction of the tunnel itself is of no specific interest in the present disclosure. Noting Fig. 5 it will be seen that an end wall 32 forming part of the tunnel structure and housing for the probe supporting apparatus has secured on its inner side a shaft bearing 33 to which is threaded a shaft housing 34. A central shaft 35 in the shaft housing includes a projecting end 36 to be received in the hand crank 8 for causing rotation of the shaft. The shaft 35 is keyed to the lead screw 7 within a second bearing member 37. By manual rotation of the crank 8 and lead screw 7, the base 4 may be reciprocated back and forth to any desired position on the bed plate 3. The parallelogram linkage supporting the probe element should be very accurately made and assembled with special attention to the fit of the pivots in the links. It is further noted that a window will normally be provided in the wind tunnel wall near the air foil under test and through the window the air sampling probe may be observed with relation to the test specimen. The flexible tubing (not shown) which connects at one end to the fitting 23' may extend to a manometer tube or any desired pressure indicator or air speed indicator.

The embodiments of the invention herein shown and described are to be regarded as illustrative only and it is to be understood that the invention is susceptible of variations, modifications and changes within the scope of the appended claims.

I claim:

1. A probe supporting apparatus for wind tunnel testing of aerodynamic sections comprising, a base member extending longitudinally with respect to the wind tunnel, a parallelogram linkage having four links pivotally connected in opposite pairs, means adjustably supporting one link of one pair in an upright position on said base member, means for adjustably supporting one link of the other pair in any angular position over a limited range on both sides of a horizontal position, and means including the other link of said one pair for retaining a projecting probe on said parallelogram linkage.

2. A probe supporting apparatus for wind tunnel testing of aerodynamic sections comprising, a base member extending longitudinally with respect to the wind tunnel, means including a manually operable member for adjusting the position of said base member along the length of the wind tunnel, a parallelogram linkage having four links pivotally connected in opposite pairs, means adjustably supporting one link of one pair in an upright position on said base member, means for adjustably supporting one link of the other pair in any angular position over a limited range on both sides of a horizontal position, and means including the other link of said one pair for retaining a projecting probe on said parallelogram linkage with the free projecting end of the probe directed upstream from the probe supporting apparatus.

3. A probe supporting apparatus for wind tunnel testing of aerodynamic sections comprising, a base member extending longitudinally with respect to the wind tunnel, a parallelogram linkage having four links pivotally connected in opposite pairs, means adjustably supporting one link of one pair in an upright position on said base member and capable of adjusting said one link within a limited range on both sides of a vertical position, means for adjustably supporting one link of the other pair in any angular position over a limited range on both sides of a horizontal position, means including the other link of said one pair for detachably retaining a projecting probe on said parallelogram linkage, a probe structure detachably retained on said other link of said one pair and having a central passage therethrough, and means at the lower end of said central passage to retain a flexible tubing in connection with said passage.

4. A probe supporting apparatus for wind tunnel testing of aerodynamic sections comprising, a base member extending longitudinally with respect to the wind tunnel, a rigid support extending upwardly from said base member, a first link secured to and extending upwardly from said rigid support, a pair of parallel links pivoted at adjacent ends on said first link at opposite ends of the first link, a probe structure including a portion forming another link the same length as said first link and parallel thereto, means pivotally mounting said other link on the other ends of said pair of parallel links, and means for adjusting the angle of said pair of parallel links with respect to the horizontal over a limited range.

5. A probe supporting apparatus for wind tunnel testing of aerodynamic sections comprising, a base member extending longitudinally with respect to the wind tunnel, a rigid support extending upwardly from said base member, a first link pivoted at the upper end of said rigid support, means to adjust the angle of said first link within a limited range on both sides of a vertical position, a pair of parallel links pivoted at adjacent ends on said first link at opposite ends of the first link, a probe structure including a portion forming another link the same length as said first link and parallel thereto, means pivotally mounting said other link on the other ends of said pair of parallel links, and means for adjusting the angle of said pair of parallel links within a limited range on both sides of horizontal positions.

6. A probe supporting apparatus for wind tunnel testing of aerodynamic sections comprising, a base member extending longitudinally with respect to the wind tunnel, a rigid support extending upwardly from said base member, a first link pivoted at the upper end of said rigid support, a turnbuckle having one end portion pivotally mounted on the upper end of said first link, a reversible servomotor fixed on said base member and including a drive shaft connected to the other end portion of said turnbuckle to adjust the angle of said first link within a limited range on both sides of a vertical position, a pair of parallel links pivoted at adjacent ends on said first link at opposite ends of the first link, a probe structure including a portion forming another link the same length as said first link and parallel thereto, means pivotally mounting said other link on the other ends of said pair of parallel links, an extension on the one of said pair of parallel links connected at the lower end of said first link, a gear sector fixed on said extension, a pinion gear meshing with said gear sector, and means including another reversible servomotor for driving said pinion gear to adjust the angle of said pair of parallel links within a limited range on both sides of horizontal positions.

HAROLD W. KLAS.

REFERENCES CITED

The following references are of record in the file of this patent:

UNITED STATES PATENTS

| Number | Name | Date |
|---|---|---|
| 1,295,046 | Lohnes | Feb. 18, 1919 |
| 1,498,023 | Fales | June 17, 1924 |
| 1,939,047 | Gerhardt et al. | Dec. 12, 1933 |